UNITED STATES PATENT OFFICE.

HUGO GELDERMANN, OF BERLIN-LICHTERFELDE, AND FRITZ ACKERMANN, OF BERLIN-FRIEDENAU, GERMANY, ASSIGNORS TO ACTIEN GESELLSCHAFT FÜR ANILIN FABRIKATION, OF BERLIN, GERMANY.

YELLOW AZO DYES.

1,086,155.     Specification of Letters Patent.     Patented Feb. 3, 1914.

No Drawing.     Application filed April 28, 1913. Serial No. 764,207.

*To all whom it may concern:*

Be it known that we, HUGO GELDERMANN and FRITZ ACKERMANN, citizens of the German Empire, residing at Berlin-Lichterfelde, Germany, and Berlin-Friedenau, Germany, respectively, our post-office addresses being Grabenstrasse 12, Berlin-Lichterfelde, Germany, and Bismarckstrasse 3, Berlin-Friedenau, Germany, respectively, have invented certain new and useful Improvements in Yellow Azo Dyes, of which the following is a specification.

The present invention relates to new yellow dyes which derive from 2-nitro-diazobenzene-4-sulfonic acid and an acetoacetarylamid and in the form of free acids probably corresponding to the formula:

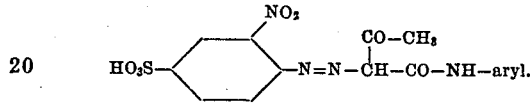

These new dyes are distinguished by their clear greenish-yellow shade and their fastness to light. They are suitable for pigments, for the free acids as well as their salts, even the sodium salts, are very difficultly soluble in water, alcohol and oil.

The new dyes may be manufactured by combining 2-nitro-diazobenzene-4-sulfonic acid with the equimolecular proportion of an acetoacetarylamid. They are in the dried and pulverized shape of the free acids, just as of the alkali or alkaline earth salts, yellow powders practically insoluble in water, alcohol, ether, benzene, anilin, pyridin, acetic acid, but soluble in concentrated sulfuric acid to a yellow solution, separating weakly yellow flocks on addition of ice. Hot caustic soda-lye dissolves the dyes. By the boiling with strong reducing agents they are slowly decomposed, yielding a colorless solution which contains among other compounds 1.2-diaminobenzene-4-sulfonic acid.

Example: 21.8 parts of 2-nitranilin-4-sulfonic acid are dissolved in water with aid of 5.5 parts of calcined sodium carbonate and the solution is diazotized by means of 70 parts of hydrochloric acid of 12° Bé. (specific gravity) and 6.9 parts of sodium nitrite. Into the diazotized mixture is poured a solution of 17.7 parts of acetoacetanilid in 12 parts of caustic soda-lye 40° Bé. and sodium acetate is then added until the reaction to Congo disappears. When the combination is complete, the dye is converted into the sodium salt by addition of sodium carbonate and this isolated in the usual manner. If instead of acetoacetanilid a substitution product thereof is used, for example acetoacetat-2-chlorandilin, a similar dye is obtained.

Having now particularly described our invention what we claim is,—

1. The new yellow azo-dyes suitable for pigments derived from 2-nitro-diazo-benzene-4-sulfonic acid and an acetoacetarylamid, in the form of free acids corresponding probably to the formula:

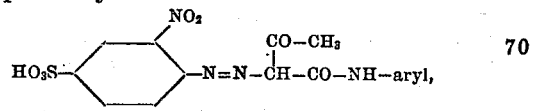

in the shape of free acids or salts being yellow powders, practically insoluble in the common solvents but soluble in hot caustic soda-lye and soluble in concentrated sulfuric acid, by boiling with strong reducing agents slowly being decomposed, yielding among other compounds 1.2-diaminobenzene-4-sulfonic acid.

2. The new yellow azo-dye suitable for pigments derived from 2-nitrodiazobenzene sulfonic acid and acetoacetanilid in the form of free acid probably corresponding to the formula:

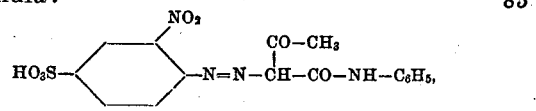

in the shape of free acids or salts being a yellow powder, practically insoluble in the common solvents but soluble in hot caustic soda-lye and soluble in concentrated sulfuric acid, by boiling with strong reducing agents slowly being decomposed, yielding among other compounds 1.2-diaminobenzene-4-sulfonic acid.

In testimony whereof we have hereunto set our hands in presence of two subscribing witnesses.

HUGO GELDERMANN.
           FRITZ ACKERMANN.

Witnesses:
   WOLDEMAR HAUPT,
   HENRY HASPER.